United States Patent

[11] 3,621,459

| [72] | Inventor | Goodwyn George Reeves<br>3324 Octavia St., Raleigh, N.C. 27606 |
|---|---|---|
| [21] | Appl. No. | 884,153 |
| [22] | Filed | Dec. 11, 1969 |
| [45] | Patented | Nov. 16, 1971 |

[54] BROADBAND LASER AMPLIFIER
5 Claims, 3 Drawing Figs.

[52] U.S. Cl. ...................................... 331/94.5,
330/4.3, 350/160
[51] Int. Cl. ........................................ H01s 3/10
[50] Field of Search ............................ 331/94.5;
332/7.51; 330/4.3

[56] References Cited
UNITED STATES PATENTS
3,439,169  4/1969  Lynch .......................... 331/94.5

*Primary Examiner*—William L. Sikes
*Attorney*—John G. Mills, III

ABSTRACT: A broadband laser apparatus and method for amplifying optical frequencies of electromagnetic radiation at different positions utilizing a laser device in which the frequency-determining energy gap varies with the position in the plane normal to the direction of electromagnetic wave propagation so that different frequencies of electromagnetic radiation are amplified at different positions in the transverse plane.

Goodwyn George Reeves
INVENTOR.

BY John G. Mills

Attorneys

BROADBAND LASER AMPLIFIER

BACKGROUND OF THE INVENTION

The present invention relates to lasers or optical masers as they are sometimes called and particularly to the laser device and method especially adapted to amplify a broad range of frequencies in a single device and for broad and simple tuning in a laser oscillator.

The operation of a laser is based upon the fact that the atomic systems represented by the molecules of the laser material can exist in any of a series of discreet levels or states with the molecules absorbing energy in the optical frequency range and going to a higher state and emitting it when going to a lower state. In the case of a ruby rod three energy levels are utilized; the atomic systems are raised from the lower or ground level to the higher of the three levels by irradiation from a strong light source which need not be coherent but should preferably have a high concentration of energy in the shorter wavelengths. A radiationless transition then occurs from the higher state to an intermediate state. This is followed by a transition with photon emission from the intermediate state back to the ground state. It is the last transition that is of interest, since this transition is the source of the coherent light produced by the laser. The operation of raising the energy level of the laser to produce desired photon emission is referred to in the art as pumping. Pumping of the atoms in the laser material by an optical light beam induces energy transitions of the atoms from a first or ground quantum energy level to a higher quantum energy level. As a result of the optical pumping, many (dependent upon the strength of the pump) of the atoms originally in the first energy level of the ground state are pumped up to the energy levels of an optically excited state. From this excited energy state, the atoms spontaneously decay to the ground state energy level. A population inversion suitable for lasing is said to occur in a three-level system when the number of atoms in the excited state exceeds that of those in the ground state. A four-level system, such as neodymium, requires only a small number of atoms in the excited state to lase.

It has also been discovered that lasing action can be imparted to suitable solid-state materials be injecting carriers at a sufficient rate and permitting those carriers to recombine. Thus, stimulated emission of radiation may be imparted to a semiconductive device by the fabrication of a PN junction in the device which is appropriately forward biased at a given injected carrier current density sufficiently high to overcome various nonradiative electron recombination and various radiation loss mechanisms in the host semiconductive crystal. A population inversion in certain forward bias PN-junction diodes such as gallium arsenide can be obtained where, for instance, the front and back surfaces are polished and constitute a Fabry-Perot cavity. It has also been shown that a four-sided cavity can be used. In the electron-beam-pumped laser, the absorption of high-energy electrons produces hole electron pairs within a narrow region close to the bombarded surface of the laser material. When the electron energy and the beam current supplied by the pumping electron beam are sufficiently high, lasing occurs.

In the past it has been sought to find ways of modulating laser beams as well as to vary the lasing frequency or tune the laser over a range of frequencies, and it has also been sought to find a laser having a broad frequency band. It has been suggested to modulate the frequency of a semiconductor junction laser as well as to vary the frequency by changing the optical length of the cavity. It has also been suggested to produce frequency modulation and mode suppression by changing the Fabry-Perot cavity length by moving external mirrors in a ruby laser.

One prior art U.S. Pat. No. 3,439,169, by William T. Lynch, suggests a tuneable beam pump solid-state laser, whose lasing frequency is controlled by positioning of an impinging pumping beam. Tuneability is achieved by grading the composition of the laser material over its length, and as a pumping beam position is changed, different portions of the sample are excited causing the material to lase at the particular frequency that is characteristic of the composition at the portion of the material excited. Thus it has been recognized that the lasing frequency may be varied with the composition of the semiconductive material or by varying the doping impurity concentration across the laser material and impinging a light or electron beam upon a particular portion.

SUMMARY OF THE INVENTION

In the present invention, a transversely adjusted gap laser is utilized in which the frequency-determining energy gap is varied with the position in the plane normal to the direction of electromagnetic wave propagation. Different frequencies of electromagnetic radiation can then be amplified at different positions in this transverse plane. A laser is provided having an optical electromagnetic radiation input source providing an optical input into an input light disperser, such as a prism, for dispersing the input light into desired input frequencies which are then focused on a graded optical amplifying means in which the dispersed light is impinged upon the laser material in a predetermined manner to produce an amplified broad band output which is focused to an output collimator, such as a prism, for collimating the output, producing a broadband of frequencies in the output beam. A method for amplifying a broad frequency band of light is also provided which includes the steps of dispersing light from an optical input source, focusing the dispersed light into a laser material, amplifying the dispersed light in the lasing material, and focusing the output of the laser into an output collimating means and collimating the light in the output. In an injection or PN-junction diode-type laser, a source of bias voltage would be connected to produce a bias across the junction and the ends thereof polished as desired to produce the desired cavity. Various types of grading both internal and external may be used for the lasing material and may include such things as graded composition or a graded doping of the laser host material as well as external gradings by the use of temperature, mechanical strain and magnetic fields.

BRIEF DESCRIPTION OF THE DRAWINGS

Other objects, features and advantages of this invention will be apparent from a study of the written description and of the drawings, in which.

DESCRIPTION OF THE PREFERRED EMBODIMENT

The basic concept of the present laser device is to produce a broadband laser in which the frequency-determining energy gap varies with position of the plane normal to the direction of the electromagnetic wave propagation. Thus, different frequencies of electromagnetic radiation can be amplified at different positions in this transverse plane. The geometrical shape of the laser material is not material so long as the electromagnetic waves can be propagated therethrough and with proper treatment of the boundaries of the laser material, it can be made to amplify or oscillate in a broad range determined by the range of the energy gap values employed. Thus, the laser material used in the pumping configuration can be any that permits the energy gap to vary with position in a transverse plane. This can be done by subjecting a uniform laser material to nonuniform external perturbation, or by producing a nonuniform or graded laser material. Thus the energy gap can be varied with position by adjusting the composition of the solid laser materials that are grown a layer of atoms at a time so that the energy gap of the material will be varied with the graded composition. Thus the present laser device can amplify a beam or electromagnetic radiation containing any broad distribution of frequencies in which the beam is dispersed by some means such as a prism or diffraction grating so that each frequency component passes through that portion of the laser material in which that particular frequency range is amplified.

Figure 1:
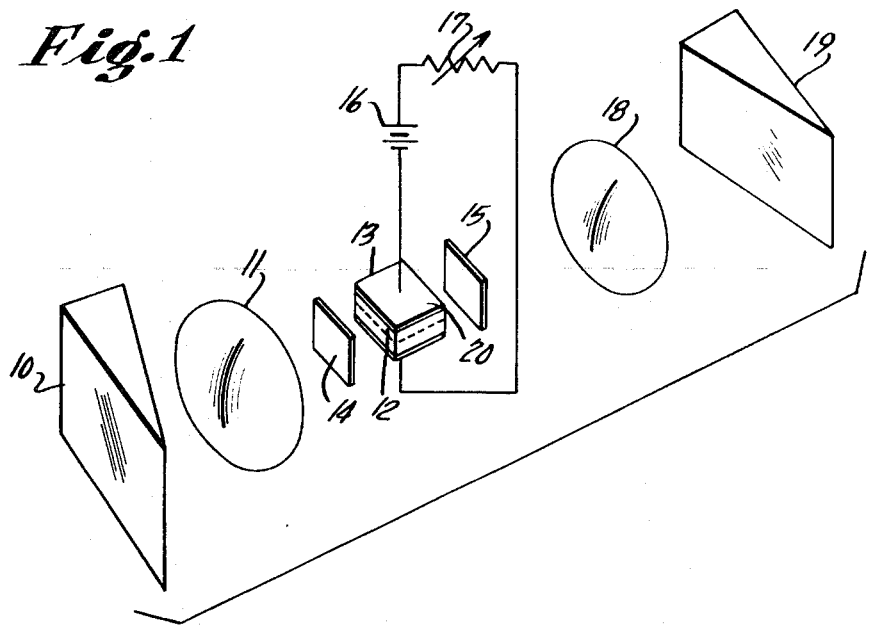
FIG. 1 shows an exploded view of one embodiment of the present invention.

Referring now to FIG. 1, an exploded view of one embodiment is shown having an input prism 10 which, while shown as a prism, could be another dispersing means such as a direct-vision prism or a diffraction grating, or might be eliminated entirely in the case where there is already an angular spread between the various input-frequency components which might be the case when some forms of optical waveguides are used in the input. The input light is angularly dispersed when passing through the prism 10, and is focused with input focusing lens 11, which while shown as having a circular aperture, could also be rectangular, or in the case sometimes of multiple-lens waveguides the focusing lens would not be needed at all. The input beam electromagnetic radiation is then impinged in a predetermined manner upon the junction 12 of a PN-junction diode 13. The PN-junction diode 13 may typically have reflecting surfaces 14 and 15 which are shown separate from the junction diode 13 in this exploded view, but either or both could be deposited directly on the face of the laser and can be adjusted to give either one-way gain only, or gain in both directions as described by K. Tomiyasu in Proceedings of the IEEE, Volume 52, pages 856–857 July 1964. Using Tomiyasu's results could result in making the reflectivity of the reflector vary in the transverse plane such that the overall gain of the amplifier is the same at low frequencies as it is at high frequencies even though the gain of the laser material may not be. PN-junction laser material 13 is shown as having a source of bias voltage 16 shown here as being connected to produce a bias across the junction 12 of the PN-junction 13 and which may also have a variable resistor 17 or voltage-dropping resistor. The output of the laser material is focused by the output-focusing lens 18 similar to the input-focusing lens 11 which focusing output radiation into an output prism 10 which may be similar to the input prism 10 and which may collimate the amplified output light beam. The PN-junction diode 13 will of course be seen to house a pair of metal contacts 20 connected to the battery 16.

Figure 2:
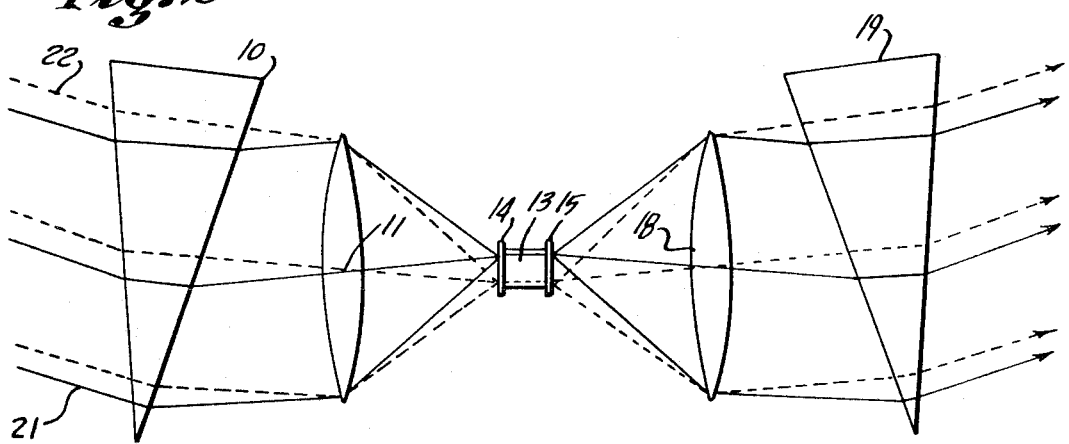
FIG. 2 illustrates the ray paths through the embodiment of FIG. 1.

In FIG. 2, there can be seen the embodiment of FIG. 1 illustrating the passage of electromagnetic radiation or light through the present apparatus. In this case solid lines 21 are used to illustrate higher frequencies than the dotted lines 22 and the collimated input light 21 and 22 can be seen passing through the input prism 10 to provide an angular dispersed ray through focusing lens 11 into the laser device 13 having a resonant cavity formed by reflective surfaces 14 and 15, producing an output through reflective surface 15 which is focused by focusing lens 18 into prism 19 where it is collimated. The laser device 13 is adapted to amplify the input radiation in a broad band of frequencies by impinging a frequency band on the input surface of the lasing material which material is internally or externally graded for receiving and amplifying a spread of frequencies matched to the frequency band being impinged thereon.

Figure 3:
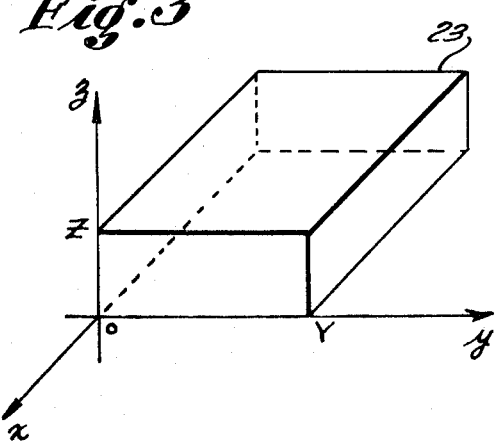
FIG. 3 illustrates a rectangular block of laser material in accordance with the present invention.

Turning now to FIG. 3, a more detailed view the laser material is illustrated in which a rectangular block of material 23 is a direct band gap semiconductor that has been grown epitaxially in the $y$ direction such that the energy band gap for lasing $E_g$ is graded in the $y$ direction. The $x$, $y$ and $z$ coordinates being illustrated in conjunction with the material 23, and having a center position $o$. This grading in the $y$ direction can be accomplished with $(In_{\gamma}Ga_{1-\gamma})A_s$ by changing the parameter $\gamma$ during growth by adjusting the In and Ga sources and/or the growth temperature. If the semiconductor is sufficiently pumped by some mechanism into a stimulated emission condition, then electromagnetic radiation passing through the semiconductor in the $x$ direction will be amplified when $(E_g/h-\Delta f/2) \leq f \leq (E_g/h+\Delta f/2)$ where $f$ is the frequency of the radiation in some region along the $y$ axis, $E_g$ is the band gap in that region, $h$ is Planck's constant, and $\Delta f$ is the band width of the gain versus frequency curve in the region. The pumping might be done with electron beam bombardment, optically, or by carrier injection across a junction. A simple junction method is to dope the semiconductor N-type during growth, and then after partitioning the material to expose the $z=Z$ surface diffuse an acceptor dopant into the $z=Z$ surface.

After putting contacts on the $z=Z$ and $z=0$ surfaces the device can be pumped by applying a voltage to the PN junction formed.

As will be clear at this point to those skilled in the art a laser device and method have been provided which contemplate pumping the whole $E_g$ range to obtain an amplified broadband-width beam and while it has been illustrated in terms of a semiconducting injecting laser, it will of course be realized that other types of lasers may also be used without departing from the spirit and scope of the present invention.

It is contemplated by the invention to produce grading in the laser by external parameters such as temperature, mechanical strain and magnetic fields. The dispersion of a broadband beam, to get each frequency component to the right place on the lasing material by a prism and focusing lens where the frequency matches the $E_g/h$, has been described but it will of course be clear that other dispersion and collimating means can be provided as desired. This invention is not to be construed as limited to the particular forms disclosed herein, since these are to be regarded as illustrative rather than restrictive.

What is claimed is:

1. A broadband laser apparatus comprising in combination:
   a. electromagnetic radiation source means adapted to produce a light input;
   b. input dispersion means for dispersing said input light in a predetermined direction;
   c. graded laser means graded along a plane normal to the direction of said input light, for receiving said dispersed light input with each predetermined frequency component passing through that predetermined portion of the graded lasing means in which that particular frequency range is amplified,
   d. pumping means coupled to said graded laser means for pumping the laser material of said laser means; and
   e. output means producing an output from said graded lasing means, whereby a broad band of frequencies is amplified.

2. The apparatus according to claim 1 in which said graded laser means includes a material adapted to lase, said material having a composition which varies across the plane normal to the direction of said input light.

3. The apparatus according to claim 1 in which said input dispersing means includes focusing said dispersed input light on said laser means and said output means includes collimating and focusing means for collimating and focusing said output from said laser means.

4. The apparatus according to claim 1 in which said graded laser means is graded by means external to the laser material.

5. The apparatus according to claim 4 in which said graded laser means is graded by temperature means.

* * * * *